(12) United States Patent
Jung et al.

(10) Patent No.: US 10,996,758 B2
(45) Date of Patent: May 4, 2021

(54) OBJECT EXECUTION METHOD USING AN INPUT PRESSURE AND APPARATUS EXECUTING THE SAME

(71) Applicant: Samsung Electronics Co., Ltd., Suwon-si (KR)

(72) Inventors: Han Chul Jung, Seoul (KR); O Jae Kwon, Seoul (KR); Chang Beom Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/564,692

(22) Filed: Sep. 9, 2019

(65) Prior Publication Data
US 2019/0391661 A1 Dec. 26, 2019

Related U.S. Application Data

(63) Continuation of application No. 15/218,779, filed on Jul. 25, 2016, now Pat. No. 10,409,373, which is a (Continued)

(30) Foreign Application Priority Data

Oct. 30, 2008 (KR) .................. 10-2008-0106935

(51) Int. Cl.
*G06F 3/01* (2006.01)
*G06F 3/0487* (2013.01)
(Continued)

(52) U.S. Cl.
CPC ............ *G06F 3/016* (2013.01); *G06F 3/0416* (2013.01); *G06F 3/0481* (2013.01);
(Continued)

(58) Field of Classification Search
CPC ...... G06F 3/016; G06F 3/0414; G06F 3/0416; G06F 3/0481
See application file for complete search history.

(56) References Cited

U.S. PATENT DOCUMENTS 5,548,705 A 8/1996 Moran et al.
5,675,329 A * 10/1997 Barker ................ G06F 3/0233
341/22
(Continued)

FOREIGN PATENT DOCUMENTS

CN 1723432 A 1/2006
EP 1003188 A2 5/2000
(Continued)

*Primary Examiner* — Eric J. Bycer
(74) *Attorney, Agent, or Firm* — Jefferson IP Law, LLP

(57) ABSTRACT

An object execution method and apparatus is provided for executing an object based on an input pressure level with a haptic feedback indicative of an attribute of the object. An object execution apparatus may include a display unit, an input unit, and a control unit. The display unit may display at least one object. The input unit may detect a selection of an object and/or a pressure level input for executing the object. The control unit may check a reference pressure value preset for the selected object. The reference pressure value may be indicative of attribute information of the object. The control unit may compare an input pressure value of the pressure level input with the reference pressure value, and may determine whether to execute the object based on the comparison result. The input unit comprising a vibration generator may generate a vibration mapped to the reference pressure value.

15 Claims, 6 Drawing Sheets

Related U.S. Application Data continuation of application No. 12/569,288, filed on Sep. 29, 2009, now Pat. No. 9,405,367.

(51) Int. Cl.

| | | |
|---|---|---|
| *G06F 3/041* | (2006.01) | |
| *G06F 3/0481* | (2013.01) | |
| *G06F 3/0486* | (2013.01) | |
| *G06F 3/0488* | (2013.01) | |
| *G06F 3/0482* | (2013.01) | |
| *G06F 3/0484* | (2013.01) | |

(52) U.S. Cl.
CPC .......... *G06F 3/0482* (2013.01); *G06F 3/0486* (2013.01); *G06F 3/0487* (2013.01); *G06F 3/04845* (2013.01); *G06F 3/04886* (2013.01)

(56) References Cited

U.S. PATENT DOCUMENTS

| | | |
|---|---|---|
| 6,002,395 A | 12/1999 | Wagner et al. |
| 6,243,080 B1 | 6/2001 | Molne |
| 6,331,852 B1 | 12/2001 | Gould et al. |
| 6,466,198 B1 | 10/2002 | Feinstein |
| 6,824,069 B2 | 11/2004 | Rosen |
| 6,967,642 B2 | 11/2005 | Sangiovanni |
| 7,134,095 B1 | 11/2006 | Smith et al. |
| 7,216,305 B1 | 5/2007 | Jaeger |
| 7,428,708 B2 | 9/2008 | Okamoto et al. |
| 7,456,823 B2 | 11/2008 | Poupyrev et al. |
| 7,499,589 B1 | 3/2009 | Cortopassi et al. |
| 7,511,703 B2 | 3/2009 | Wilson et al. |
| 7,519,223 B2 | 4/2009 | Dehlin et al. |
| 7,676,767 B2 | 3/2010 | Hofmeister et al. |
| 7,847,789 B2 | 12/2010 | Kolmykov-Zotov et al. |
| 7,877,707 B2 | 1/2011 | Westerman et al. |
| 7,907,128 B2 | 3/2011 | Bathiche et al. |
| 7,952,566 B2 | 5/2011 | Poupyrev et al. |
| 8,188,981 B2 | 5/2012 | Shahoian et al. |
| 8,402,382 B2 | 3/2013 | Agarawala et al. |
| 8,516,397 B2 | 8/2013 | Frazier et al. |
| 2002/0140680 A1 | 10/2002 | Lu |
| 2004/0021643 A1 | 2/2004 | Hoshino et al. |
| 2005/0110769 A1 | 5/2005 | Dacosta et al. |
| 2006/0020898 A1 | 1/2006 | Kim et al. |
| 2006/0050059 A1 | 3/2006 | Satoh et al. |
| 2006/0053387 A1 | 3/2006 | Ording |
| 2006/0109252 A1 | 5/2006 | Kolmykov-Zotov et al. |
| 2006/0132457 A1 | 6/2006 | Rimas-Ribikauskas et al. |
| 2006/0284858 A1* | 12/2006 | Rekimoto ............ G06F 3/0488 345/173 |
| 2007/0044035 A1 | 2/2007 | Amadio et al. |
| 2007/0157089 A1 | 7/2007 | Van Os et al. |
| 2007/0229455 A1 | 10/2007 | Martin et al. |
| 2008/0024459 A1 | 1/2008 | Poupyrev et al. |
| 2008/0036743 A1* | 2/2008 | Westerman ........... G06F 3/0488 345/173 |
| 2008/0150905 A1 | 6/2008 | Grivna et al. |
| 2008/0168403 A1 | 7/2008 | Westerman et al. |
| 2008/0180405 A1 | 7/2008 | Han et al. |
| 2008/0303799 A1* | 12/2008 | Schwesig ............. G06F 3/0414 345/173 |
| 2009/0002140 A1* | 1/2009 | Higa ...................... G06F 3/016 340/407.1 |
| 2009/0064055 A1 | 3/2009 | Chaudhri et al. |
| 2009/0135142 A1 | 5/2009 | Fu et al. |
| 2009/0140986 A1 | 6/2009 | Karkkainen et al. |
| 2009/0140989 A1 | 6/2009 | Ahlgren |
| 2009/0231271 A1 | 9/2009 | Heubel et al. |
| 2009/0273571 A1 | 11/2009 | Bowens |
| 2009/0307623 A1 | 12/2009 | Agarawala et al. |
| 2010/0031202 A1 | 2/2010 | Morris et al. |

FOREIGN PATENT DOCUMENTS

| | | |
|---|---|---|
| EP | 1 659 481 A2 | 5/2006 |
| GB | 2344905 | 6/2000 |
| GB | 2381499 A | 5/2003 |
| JP | 2005-332063 A | 12/2005 |
| KR | 10-2004-0062956 A | 7/2004 |
| KR | 10-2005-0038295 A | 4/2005 |
| KR | 10-2006-0057518 A | 5/2006 |
| KR | 10-2007-0023403 | 2/2007 |
| WO | 2007102092 A2 | 9/2007 |

* cited by examiner

OBJECT EXECUTION METHOD USING AN INPUT PRESSURE AND APPARATUS EXECUTING THE SAME

CROSS REFERENCE TO RELATED APPLICATION

This application is a continuation application of prior application Ser. No. 15/218,779, filed on Jul. 25, 2016, which will issue as U.S. Pat. No. 10,409,373 on Sep. 10, 2019; which is a continuation application of prior application Ser. No. 12/569,288 filed on Sep. 29, 2009, which has issued as U.S. Pat. No. 9,405,367 on Aug. 2, 2016; and which was based on and claimed the benefit under 35 U.S.C § 119(a) of a Korean Patent Application filed on Oct. 30, 2008, in the Korean Intellectual Property Office and assigned Serial number 10-2008-0106935, the entire disclosure of each of which is hereby incorporated by reference.

BACKGROUND OF THE INVENTION

Field of the Invention

Exemplary embodiments of the present invention relate to an object execution mechanism, and to an object execution method and apparatus for executing an object based on an input pressure level with a haptic feedback indicative of an attribute of the object.

Description of the Background

Typically, electronic devices (e.g., personal computers and mobile communication terminals) that can execute application programs are provided with at least one input device and a display for a user to search for and execute a task while viewing visual representations of various tasks and objects. With the advancement of technology and change of users' needs, text-based visual representations have been replaced by graphical images and icons.

Objects (e.g., files and folders containing multimedia data including text, audio, and still and motion pictures) and icons representing the objects are stored together with attribute information providing details about the creation of the objects. For instance, the attribute information of a file can include creation time, file format, file name, and playback time. The attributes are visually provided to the user when the corresponding file, folder, or icon is selected by the user. Assuming a computing environment in which a specific application is running on a computer with a display of files related to the application, a series of commands input by the user (e.g., placing a mouse pointer on the file and then clicking a right button of the mouse) may make the computer display the attribute information (i.e., the file size, file name, and the creation time of the file) of the selected file. If the selected file is executed, the execution command may be input by a behavior commonly adopted for all kinds of files (e.g., clicking the left button of the mouse). In such a conventional file execution method, the user may input the attribute information request command by clicking the right button of the mouse or input the execution command by clicking the left button of the mouse for executing the selected file regardless of the attribute information of the file. That is, the conventional file execution method may be limited to providing the attribute information of a selected file without visual presentation. Furthermore, since all file formats are executed using the same input behavior, the user's recognition of the attributes of the executed file may be limited. There is therefore a need to develop a method for providing the user with the attribute information of a selected object in another sensory modality (e.g., method) rather than the conventional sensory modality, and for executing the selected object with different input behaviors according to the attribute information.

SUMMARY OF THE INVENTION

Exemplary embodiments of the present invention relate to an object execution method and apparatus to execute an object with different input behavior depending on the attribute information of the object.

Additional features of the invention will be set forth in the description which follows, and in part will be apparent from the description, or may be learned by practice of the invention.

Exemplary embodiments of the present invention disclose an object execution apparatus including a display unit, an input unit, and a control unit. The display unit displays at least one object. The input unit detects a selection of one of the at least one object. The control unit determines a reference pressure value associated with the selected object and indicative of attribute information of the object. The control unit compares the reference pressure value with an input pressure value corresponding to a pressure level input for executing the selected object. The control unit determines whether to execute the object based on a result of the comparison Exemplary embodiments of the present invention also disclose an object execution method. The object execution method includes detecting a selection of an object, determining a reference pressure value associated with the object. The reference pressure value is indicative of attribute information of the object. The method further includes comparing, if a pressure is input for executing the object, the reference pressure value with an input pressure value corresponding to the input pressure. The method further includes executing, if the input pressure value is greater than the reference pressure value, the object.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
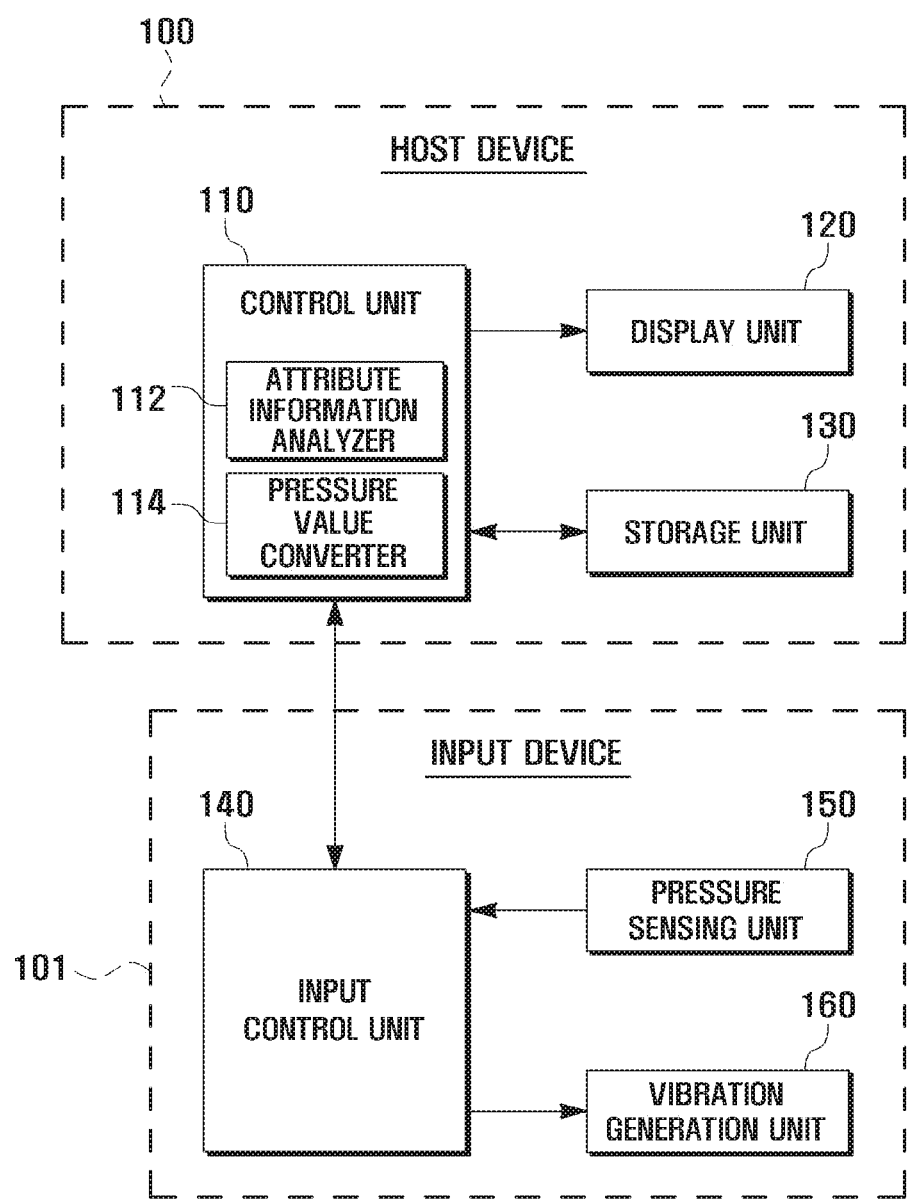
FIG. 1 is an object execution apparatus according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A procedure for providing the user with representative information (e.g., pressure value information) mapped to the attribute information of objects (e.g., files and folders and/or icons linked to the files and folders) and executing an object in response to an execution command input (e.g., a pressure input) is described herein with reference to accompanying drawings. In order to simplify the explanation, it is assumed that the representative information mapped to the attribute information is pressure value information and that the pressure value information feeds back a vibration to the user.

Prior to explaining exemplary embodiments of the present invention, relevant terminology will be defined for the description below.

An "object" may refer to data, a function, a file including the data and/or function, and a folder or an icon representing one of the data, the function, the file, or the folder.

"Attribute" may refer to metadata that describes or is associated with the object. An attribute can be, for example, a creation time, file format, file name, or priority. An object may have attribute information. The pressure value of the object can be set according to attribute information shared in common by the objects related to a specific application.

An object execution apparatus according to exemplary embodiments of the present invention can be implemented with an integrated input device or, in some cases, a separate input device. The input device may be used for inputting commands to execute objects. An object execution apparatus is described with reference to FIG. 1.

FIG. 1 is an object execution apparatus according to exemplary embodiments of the present invention.

Referring to FIG. 1, the object execution apparatus may include a host device 100 having applications and executable objects, and an input device 101 for generating commands to select and execute the objects in response to a user's manipulation. The input device 101 may transmit the commands to the host device 100. The host device 100 may include a control unit 110, a display unit 120, and a storage unit 130. The input device 101 may include an input control unit 140, a pressure sensing unit 150, and a vibration generation unit 160. It should be understood that various other function blocks can be further included in the host device 100 and the input device 101 and that the host device 100 and input device 101 are not limited to the components noted above. For example, if the host device 100 and the input device 101 are connected to each other through a radio link, each of the host device 100 and the input device 101 may further include a radio communication unit. The host device 100 and the input device 101 can be a computer and a mouse, respectively, or an Internet Protocol Television (IPTV) and a remote control, respectively. The host device 100 can be a desktop computer, a laptop computer, an IPTV, a mobile terminal, a Smartphone, and, in general, any suitable device that can store and execute the objects.

The control unit 110 may control entire operations of the host device 100. The control unit 110 can set attribute-specific pressure values for executing objects automatically, or, in some cases, according to user inputs. The control unit 110 may check the pressure value set for an object when an object selection command is received from the input unit 101, and may send a vibration value corresponding to the pressure value to the input device 101. The control unit 110 may also execute the selected object in response to a touch input having a pressure value that is greater than a preset pressure value.

The control unit 110 may include an attribute information analyzer 112 and a pressure value converter 114. The attribute information analyzer 112 may refer to the reference pressure value set for the selected object and may determine whether the input pressure value is greater than the reference pressure value. The pressure value converter 114 may determine a reference pressure value corresponding to the pressure value set for the selected object, and may convert the reference pressure value into a vibration value for generating a vibration indicative of the attribute information of the selected object.

The display unit 120 may display an operation status of the host device 100, application windows, and a user input status. The application windows may present visual data generated while applications are running in the host device 100. The user input status may be displayed with a pointer. The display unit 120 can be implemented with a Liquid Crystal Display (LCD) panel, or, in general, any suitable display device. The display unit 120 can include an LCD controller, a memory for buffering video data, and LCD devices.

The storage unit 130 can include a program memory and a data memory. The program memory may store the application programs running in the host device 100. The data memory may buffer the data generated while applications are running, and may store data downloaded from an external device and generated by the applications. The data memory may store the object-specific attribute information, the pressure values corresponding to the attribute information, and the vibration values corresponding to the pressure values.

The input control unit 140 controls the operation of the input device 101, sends a signal corresponding to the pressure, which is input by the user through the pressure sensing unit 150, to the control unit 110 of the host device 100, and controls the generation of the vibration by the vibration generation unit 160 based on the vibration value received from the control unit 110. The pressure sensing unit 150 may include a sensor such as, for example, a force sensor for sensing a pressure input by the user. The vibration generator 160 may include an actuator, such as, for example, a vibration motor to generate a feedback (e.g., vibration).

The operations of the host device 100 and the input device 101 for executing an object are described hereinafter with reference to FIG. 2 and FIG. 3.

Figure 2:
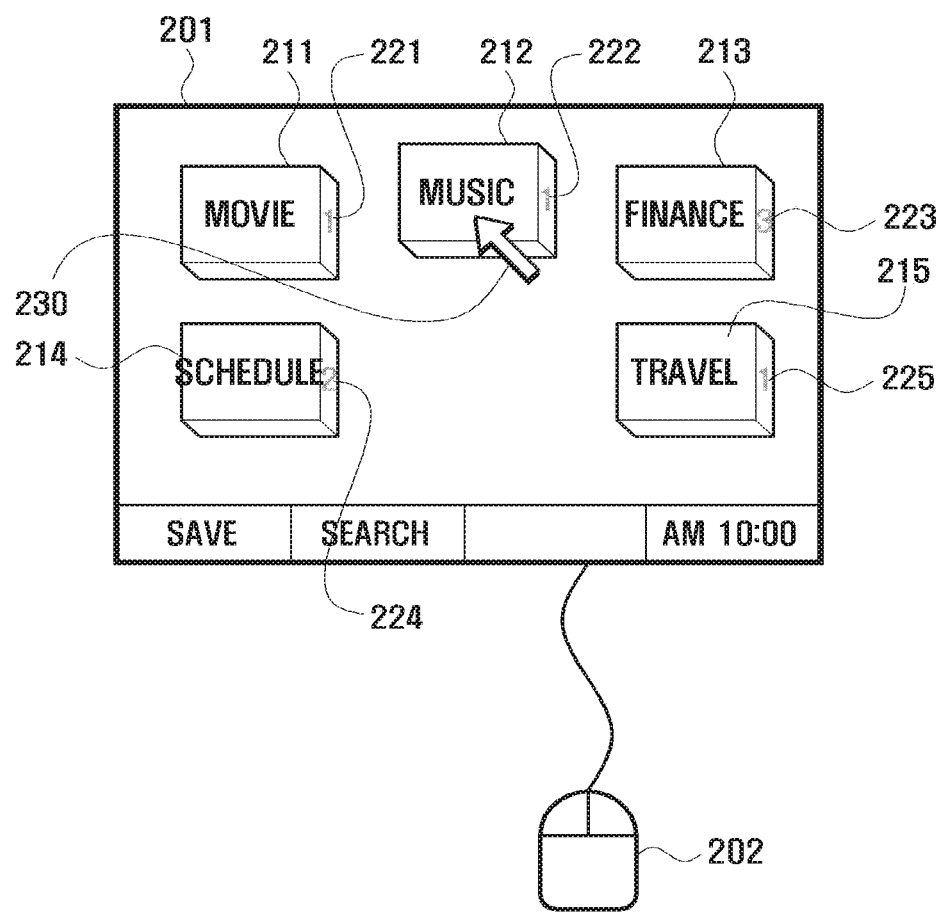
FIG. 2 is a diagram illustrating an exemplary case in which an object is executed by interoperation of a host device and an input device according to exemplary embodiments of the present invention.

FIG. 2 is a diagram illustrating an exemplary case in which an object is executed by interoperation of a host device and an input device according to exemplary embodiments of the present invention. As shown in FIG. 2, an application screen 201 may display a plurality of objects provided by means of the display unit 120. A mouse 202 may correspond to the input device 101 of FIG. 1.

Referring to FIG. 2, a plurality of objects 211, 212, 213, 214, and 215 are displayed in an "explorer" application screen 201. Object 211 may be a movie folder (or movie folder icon) containing movie files prioritized with a low priority. Object 211 may be mapped to a pressure value 221 of '1' designated for indicating a low priority level of the attribute information. Pressure values 221, 222, 223, 224, and 225 corresponding to objects 211, 212, 213, 214, and 215, respectively, are displayed in FIG. 2 to help explain exemplary embodiments of the present invention, but may not be displayed in the application screen 201. Object 212 may be a music folder (or music folder icon) containing music files prioritized with a low priority. Object 212 may be mapped to a low pressure value 222 of '1.' In the exemplary application screen 201, a mouse pointer 230 may be located at the music folder 212. The user can navigate the pointer 230 and select an object (e.g., music folder 212) in the application screen 201 by manipulating the mouse 202. The selected object can be displayed differently from other objects. For instance, when the music folder 212 is selected, the music folder 212 may float above the other unselected objects 211, 213, 214, and 215.

Object 213 may be a finance folder (or finance folder icon) containing financial data and/or files prioritized with a high priority. Object 213 may be mapped to a high pressure value 223 of '3.' Object 214 may be a schedule folder (or schedule folder icon) containing schedule data and/or files prioritized with an intermediate priority. Object 214 may be mapped to a pressure value 224 of '2.' Object 215 may be a travel folder (or travel folder icon) containing travel-related data and/or files prioritized with a low priority. Object 215 may be mapped to a pressure value 225 of '1.' The objects displayed in the "explorer" application screen 201 may have attribute information including creation time, file format, file size, content, and priority. Although objects may be classified by priority among the attributes, and the priority levels may be mapped to corresponding pressure values as described above, the objects can be classified by various other attributes having levels mapped to the pressure values. For instance, when the object is a multimedia folder, multimedia data contained in the multimedia folder can be classified by playback time or file size. The values of playback time or file size can be mapped to corresponding pressure values. In addition, although three priority levels (i.e., low, intermediate, and high priority levels) have been described and mapped to the respective pressure values 1, 2, and 3, the priority levels can be assigned in a various ways. For example, in some cases, five or size priority levels may be used and assigned to respective pressure values. In general, any suitable number of priority levels and respective pressure values may be used. Mapping the priority levels to the pressure values assignment can be carried out automatically, or, in some cases, manually according to the user configuration.

As shown in FIG. 2, when the music folder 212 is selected by placing the pointer 230 on the music folder 212, the control unit 110 (more specifically, the attribute information analyzer 112 of the control unit 110) may check the pressure value designated for the music folder 212. After the attribute information analyzer 112 checks the reference pressure value, the pressure value converter 114 may convert the pressure value '1' into a 'weak vibration' value. The converted 'weak vibration' value may be sent to the input control unit 140 of the input device 101. In response to the receipt of the 'weak vibration' value, the input control unit 140 may instruct the vibration generation unit 160 to generate a weak vibration (e.g., the mouse is vibrated weakly). As noted above, vibration may be generated in three levels (e.g., weak, intermediate, and strong) to indicate the values of the attribute information. The vibration levels may be expressed in a different manner depending on the vibration motor of the input device 101 (e.g., mouse). For instance, the weak, intermediate, and strong vibrations can be defined by respective voltages (e.g., 0.5V, 1V, and 2V) applied for a predetermined duration, for example, 0.1 second, 1 second, and 3 seconds at an identical voltage level. The weak, intermediate, and strong vibrations may thus also be defined by the duration of the vibration time. Using such haptic feedbacks based on the vibration levels, the user can acquire attribute information of the selected object.

In the application screen 201 of FIG. 2, the movie folder 211, music folder 212, and travel folder 215 have the pressure value '1' which is low compared to the pressure values '3' and '2' of the finance folder 213 and schedule folder 214, respectively. Accordingly, objects assigned the pressure value 1 can be executed in response to a low pressure input, but the object(s) assigned the pressure value 3 may require a relatively high pressure input to be executed. The pressure values corresponding to the pressure levels may be preset by means of the force sensor in the pressure sensing unit 150. If input commands are determined based on the pressure input duration, the target object may be executed in response to maintaining a predetermined level of pressure for a predetermined period of time. For instance, when the user attempts to move the files contained in the schedule folder 214 to the travel folder 215 with a "drag and drop" behavior, a pressure level greater than the pressure value of the schedule folder 214 must be maintained during the drag and drop process in order to successfully moves the files. If the pressure level becomes lower than the pressure value of the schedule folder 214, the file transfer from the schedule folder 214 to the travel folder 215 may be canceled.

Figure 3:
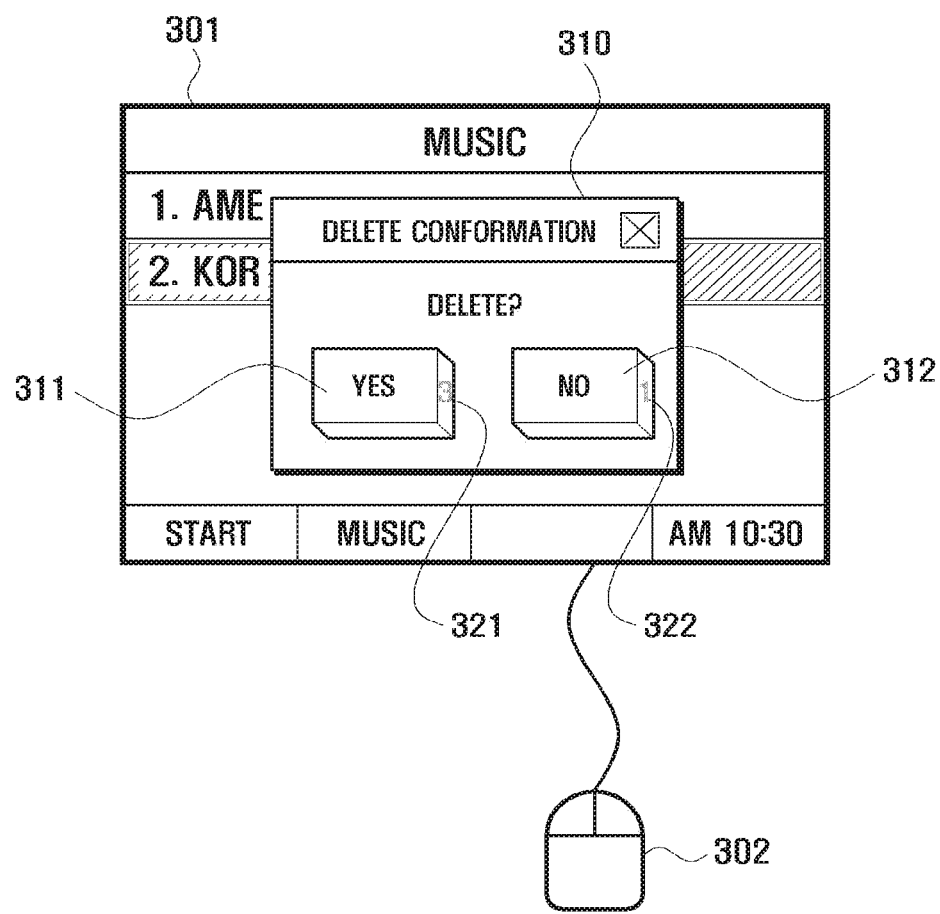
FIG. 3 is a diagram illustrating an exemplary case in which an object is executed by interoperation of a host device and an input device according to exemplary embodiments of the present invention.

FIG. 3 is a diagram illustrating an exemplary case in which an object is executed by interoperation of a host device and an input device according to exemplary embodiments of the present invention.

When the music folder 212 is selected, a music menu screen 301 having menu items such as, for example, 'American Pop' and 'Korean Pop' may be displayed. If the user navigates the pointer onto the 'Korean Pop' item and inputs a delete command by means of the input device 302 while the pointer is placed on the 'Korean Pop' item, the control unit 110 may instruct the display unit 120 to display a popup dialog window 310 having 'yes' and 'no' buttons 311 and 312 and a confirmation request message. In the popup dialog window 310, the object 'yes' button 311 may have a higher priority than that of the object 'no' button 312 and, as a consequence, the 'yes' button 311 may be assigned a pressure value of 3 and the 'no' button 312 may be assigned a pressure value of 1. To execute the object assigned the pressure value 3 (e.g., 'yes' button), a pressure level greater than the pressure level required for executing the object assigned the pressure value of 1 (e.g., 'no' button) must be applied onto the mouse 302. The mouse 302 can be configured such that, when the pointer is placed on the object (e.g., 'yes' button 311 or 'no' button 312), a vibration corresponding to the pressure value of the object may be generated to provide feed back of the attribute information to the user. For example, the mouse 302 may be vibrated based on the determined pressure value. If a pressure level greater than the pressure value of the selected object is input by means of the mouse 302, the control unit 110 may execute the object. The pressure levels may be set in consideration of the force sensor of the mouse 302.

An object execution method for providing attribute information using a vibration, and for executing objects in response to a pressure level satisfying the pressure value indicated by the attribute information, is described hereinafter with reference to FIG. 4.

Figure 4:
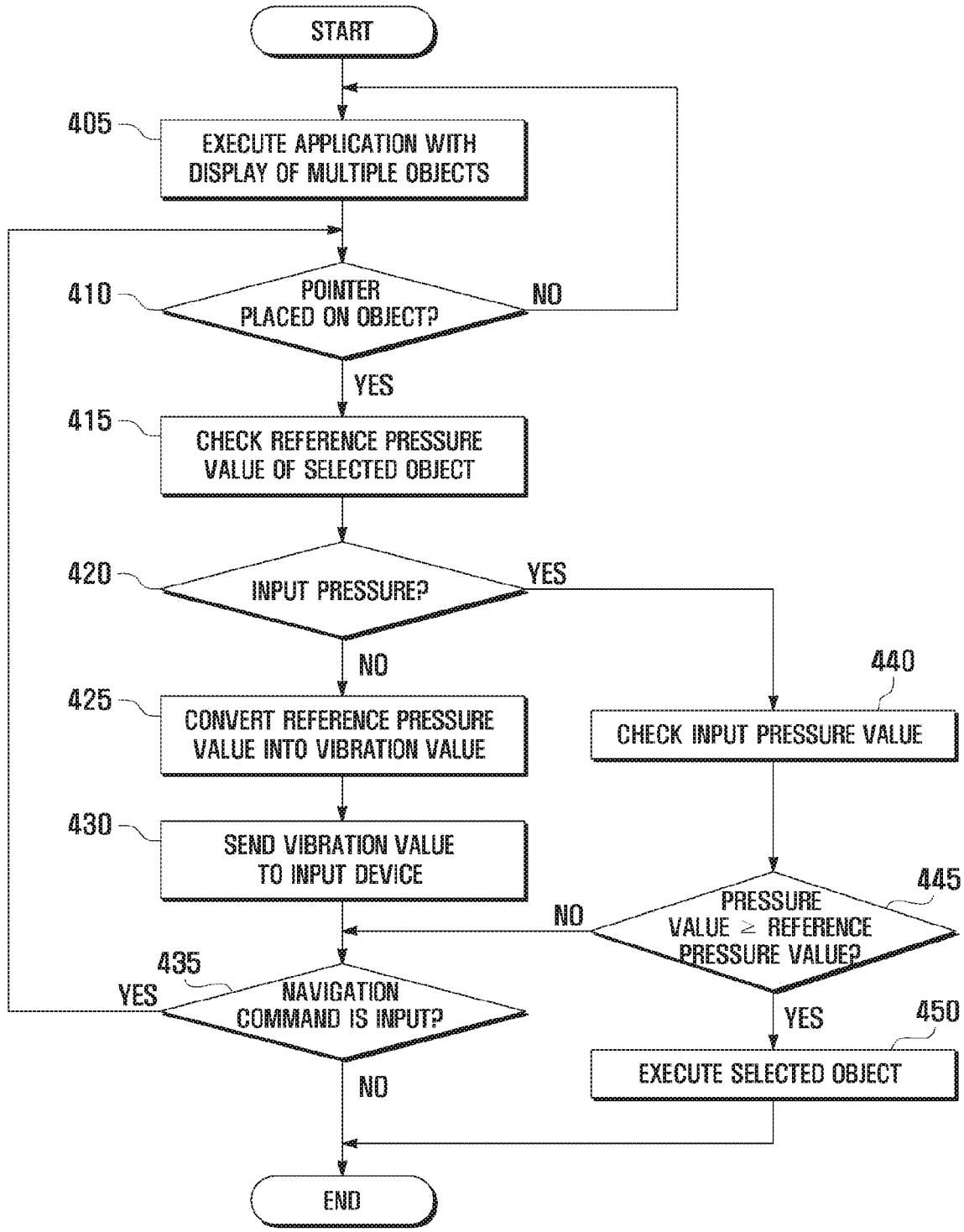
FIG. 4 is a flowchart illustrating an object execution method according to exemplary embodiments of the present invention.

FIG. 4 is a flowchart illustrating an object execution method according to exemplary embodiments of the present invention.

Referring to FIG. 4, the control unit 110 of the host device 100 of FIG. 1 may execute a specific application and may display a corresponding application screen 201 having a plurality of objects on the display unit 120 (405). The application may be executed in response to a user command input by means of the input device 101. Next, the control unit 110 may monitor input of a user command by means of the input device 101 to select an object. For example, the control unit 110 may determine whether the pointer is placed on an object (410). If the pointer is placed on an object, the control unit 110 may check the reference pressure value assigned to the selected object (415). If no object is selected, the control unit 110 may return to and proceed with step 405.

After checking the reference pressure value assigned to the selected object at step 415, the control unit 110 may determine whether a pressure level is input by means of the input device 101 (420). The pressure sensing unit 150 senses a pressure input by the user and the control unit 110 compares the reference pressure value with an input pressure value corresponding to the pressure level input for executing the selected object. If the input pressure value corresponding to the pressure level input is greater than the reference pressure value, control unit 110 may consider that the pressure level is input, and otherwise, control unit 110 may consider that the pressure level is not input. If a pressure level is input by means of the input device 101, the control unit 110 may proceed to step 440. If the pressure level is not input, the control unit 110 may proceed to step 425. At step 425, the pressure value converter 114 of the control unit 110 may convert the reference pressure value of the selected object into a corresponding vibration value (425) and may send the vibration value to the input device 101 such that the input device 101 may generate a vibration corresponding to the vibration value (430). Next, the control unit 110 may determine whether a navigation command for navigating the pointer is input by means of the input device 101 (435). If a navigation command is input, the control unit 110 may move the pointer according to the navigation command and the control unit 110 may return to and proceed with step 410. If a navigation command is not input, the object execution method may be terminated.

Returning to step 420, if a pressure level is input by means of the input device 101, the control unit 110 may check the input pressure value (440). The input pressure value may be calculated on the basis of the pressure level received from input device 101 by means of the pressure value converter 114. Next, the attribute information analyzer 112 may determine whether the input pressure value is equal to or greater than the reference pressure value of the selected object (445). If the input pressure value is equal to or greater than the reference pressure value of the selected object, the control unit 110 may execute the selected object (450). If the host device 100 is configured to execute a specific function in response to a duration-based command (e.g., a drag and drop command) requiring maintenance of a predetermined level of pressure for a predetermined period of time, the control unit 110 can further determine whether the pressure level is maintained for the predetermined duration. If the input pressure value is less than the reference pressure value of the selected object at step 445, the process may continue with step 435.

An object execution apparatus implemented with an integrated input device according to exemplary embodiments of the present invention is described with reference to FIG. 5.

Figure 5:
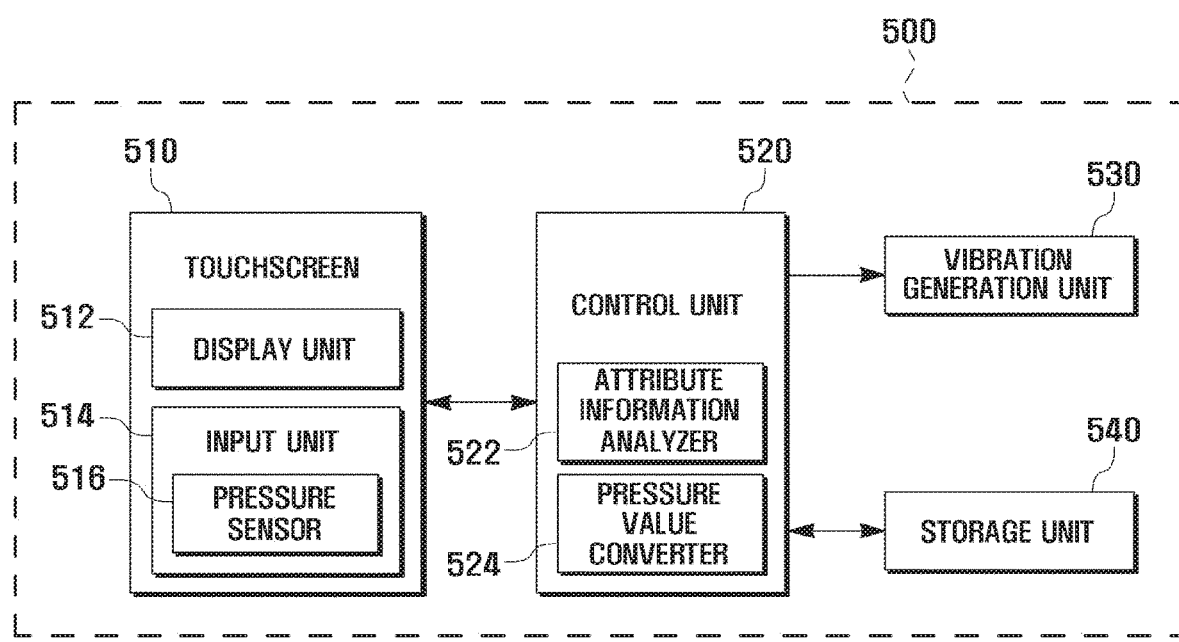
FIG. 5 is an object execution apparatus having an integrated input device according to exemplary embodiments of the present invention.

FIG. 5 is an object execution apparatus having an integrated input device according to exemplary embodiments of the present invention.

Referring to FIG. 5, an object execution device 500 may include a touch screen 510, a control unit 520, a vibration generation unit 530, and a storage unit 540. The touch screen 510 may include a display unit 512 and an input unit 514. The touch screen 510 may integrate the display and input functionalities, and may generate an input signal in response to a touch on the display screen. The touch screen 510 can detect at least one touch event occurring on the display unit 512. The display unit 512 may display an operation status of the object execution apparatus 500 and visual data generated while applications are running in the object execution device 500. The display unit 512 can be implemented with an LCD, or, in general, any suitable display device. In some cases, the display unit 512 can be provided with an LCD controller, a video memory for buffering video data, and/or LCD devices. The input unit 514 can be implemented on the display unit 512 to generate an input signal in response to the touch event on the display unit 512. The input unit 514 can include a touch sensor (not shown) and/or a signal converter (not shown). The touch sensor can sense a touch event by detecting the change of a physical quantity (e.g., resistance or capacitance). The signal converter may convert the detected change of physical quantity into a digital signal. The signal converter may determine whether the touch sensed by the change of physical quantity is a tap event or drag event, and may calculate the coordinates of the point at which the touch event is detected. The input unit 514 may also output the pressure level input by means of the pressure sensor 516 to the control unit 520. The pressure sensor 516 can be implemented with a sensor, such as, for example, a force sensor for detecting a pressure level input by the user.

The control unit 520 may control entire operations of the object execution apparatus. The control unit 520 can set the attribute-specific pressure values for executing objects automatically or according to user inputs. The controller 520 may check the reference pressure value set for the object when an object selection command is input, and may send a vibration value corresponding to the reference pressure value to the vibration generation unit 530. The control unit 520 may include an attribute information analyzer 522 and a pressure value converter 524. The attribute information analyzer 522 may refer to the reference pressure value set for the selected object and may check whether the input pressure value is greater than the reference pressure value. If the input pressure value is greater than the reference pressure value, the pressure value converter 524 may determine a reference pressure value corresponding to the input pressure value and may convert the reference pressure value into a vibration value for generating a vibration indicative of the attribute information of the selected object.

The vibration generator 530 can be implemented with a vibration motor, such as, for example, an actuator, and can generate a vibration corresponding to the vibration value under the control of the control unit 520. The storage unit 540 can include a program memory and a data memory. The program memory may store the application programs running in the object execution apparatus. The data memory may buffer the data generated while the applications are running, and may store data downloaded from an external device and data generated by the application programs running in the object execution apparatus. The data memory may store the object-specific attribute information, the pressure values assigned to the attribute information, and the vibration values corresponding to the pressure values.

Although the object execution apparatus 500 may include essential function blocks required for executing an object in FIG. 5, the object execution apparatus 500 may also include other function blocks. For example, the object execution apparatus 500 can be a communication terminal, a Personal Data Assistant (PDA), a Smartphone, and any other suitable device having an integrated input unit.

Figure 6:
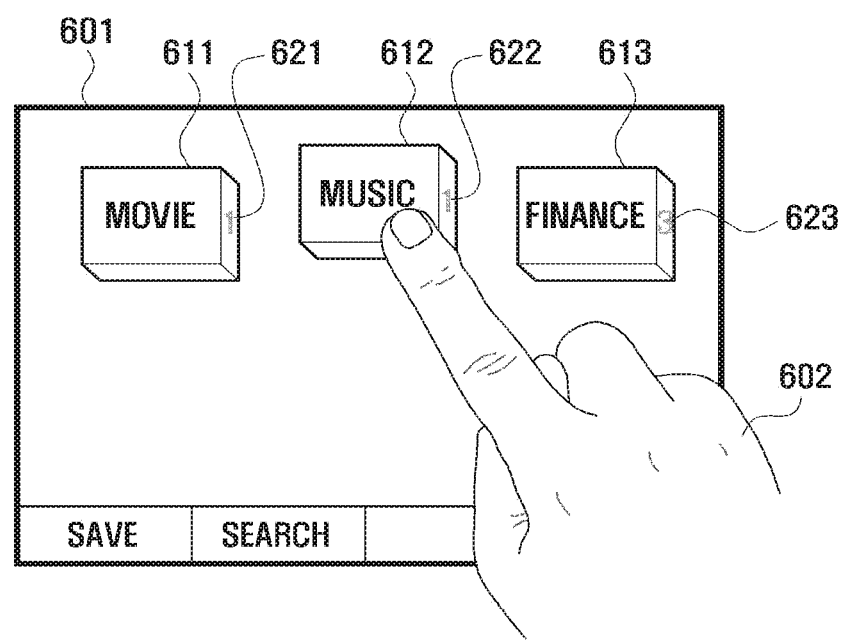
FIG. 6 is a diagram illustrating an exemplary case in which the object execution apparatus executes an object according to exemplary embodiments of the present invention.

FIG. 6 is a diagram illustrating an exemplary case in which the object execution apparatus executes an object according to exemplary embodiments of the present invention. In FIG. 6, an application screen 601 may display a plurality of objects. The application screen 601 may be provided by means of the display unit 512 of the object execution apparatus 500.

Referring to FIG. 6, a plurality of objects 611, 612, and 613 may be displayed in an "explorer" application screen 601. Object 611 may be a movie folder (or movie folder icon) containing movie files prioritized with a low priority. The object 611 may be mapped to a pressure value 621 of '1' designated for indicating a low priority level of the attribute information. It should be understood that although objects 611, 612, and 613 are displayed in FIG. 6 together with corresponding pressure values 621, 622, and 623, respectively, to help explain exemplary embodiments of the present invention, the pressure values 621, 622, and 623 may not be displayed on the application screen 601. Object 612 may be a music folder (or music folder icon) containing music files prioritized with a low priority. The object 612 may be mapped to a low pressure value 622 of '1.' In some cases, the user's finger may touch a part of the music folder 622 to select the music folder 622. Accordingly, an object displayed on the display unit 512 can be selected by touching a position at which the object is placed. The selected object can be displayed differently from other objects. For instance, when the music folder 612 is selected, the music folder 612 may float above other unselected objects 611 and 613. Object 613 may be a finance folder (or finance folder icon) containing financial data and/or files prioritized with a high priority. The object 613 may be mapped to a high pressure value 623 of '3.' The objects displayed with the "explorer" application have attribute information, which includes, for example, creation time, file format, file size, content, and/or priority. Although the objects may be classified by priority among the attributes, and the priority levels may be mapped to corresponding pressure values as described above, the objects can be classified by various other attributes having levels mapped to the pressure values. For instance, when the object is a multimedia folder, the multimedia data contained in the multimedia folder can be classified by playback time or file size of which values are mapped to corresponding pressure values. In addition, although three priority levels (e.g., low, intermediate, and high priority levels) have been described and mapped to the respective pressure values 1, 2, and 3, the priority levels can be assigned in various ways. For example, in some cases, five or six priority levels may be used and assigned to respective pressure values. In general, any suitable number of priority levels and respective pressure values may be used. Mapping the priority levels to the pressure values assignment can be carried out automatically or manually according to the user configuration.

As shown in FIG. 6, when the music folder 612 is selected by touching the position at which the music folder 612 is placed on the touch screen 510, the control unit 520 (more specifically, the attribute information analyzer 522) may check the reference pressure value (=1) designated for the music folder 612. After the attribute information analyzer 522 checks the reference pressure value, the pressure value converter 524 may convert the pressure value '1' designated for the attribute of the music folder into a 'weak vibration' value. The converted 'weak vibration' value may be sent to the vibration generator 530. In response to the 'weak vibration' value, the vibration generation unit 530 may generate a weak vibration. A vibration may be generated in three different levels (e.g., weak, intermediate, and strong) corresponding to the values of the attribute information, and the vibration levels may be expressed in different manners depending on the vibration motor. For instance, the weak, intermediate, and strong vibrations can be defined by respective voltages of 0.5V, 1V, and 2V, respectively, and may be applied for a predetermined period of time (e.g., 0.1 second, 1 second, and 3 seconds) at an identical voltage level. In some cases, the weak, intermediate, and strong vibrations may be defined by the duration of the vibration time. Using such haptic feedback based on the vibration levels, the user can acquire the attribute information of the selected object.

In the application screen 601 of FIG. 6, the movie folder 611 and the music folder 212 may be assigned the pressure value '1' which is low compared to the pressure value '3' of the finance folder 613. Accordingly, the objects assigned the pressure value 1 can be executed in response to a low pressure input, and the objects assigned the pressure value 3 may require a relatively high pressure input to be executed. The pressure values corresponding to the pressure levels may be preset by means of the force sensor of the pressure sensor 516. The pressure level input by the user can be measured by the pressure sensor of the input unit 514. If input commands are determined based on the pressure input duration, the target object may be executed in response to maintenance of a predetermined level of pressure for a predetermined period of time. Since the object execution operations for the object execution apparatus of FIG. 6 are identical to those of FIG. 4, detailed description of the object execution method for the apparatus FIG. 6 may be omitted.

As described above, exemplary embodiments of the present invention disclose an object execution method and apparatus to provide a user of the apparatus with an intuitive and efficient user interface using haptic and visual feedback. The object execution method and apparatus described herein may also enable the user to check the attribute information of a selected object with distinct haptic feedback without viewing the screen. The object execution method and apparatus may also provide an input/output interface operating in a novel haptic modality in which information is output in distinctive haptic feedbacks and input in distinctive physical quantities (e.g., pressure levels), thereby improving user satisfaction. Since a command input for executing an object is determined on the basis of the pressure level specific to the object, the object execution method and apparatus of the present invention may reduce the probability of faulty execution of an object.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of executing a function performed by an electronic device, the method comprising:
   displaying a first object on a display of the electronic device;
   receiving, through the display of the electronic device, a first user touch input on the displayed first object;
   based on that a pressure of the first user touch input on the displayed first object is greater than or equal to a first reference pressure, executing a first function associated with the displayed first object while the first user touch input is maintained on the display of the electronic device;
   based on that the first user touch input is not maintained on the display of the electronic device while executing the first function associated with the displayed first object, stopping the executing of the first function associated with the displayed first object; and
   based on that a second user touch input on the displayed first object is received through the display of the electronic device, executing a second function associated with the displayed first object,
   wherein the second user touch input is a drag interaction continuously input on the display from a point of the display corresponding to the first user touch input,
   wherein the first function is a function of displaying a first user interface (UI) regarding the first object on the display of the electronic device,
   wherein the second function is a function displaying a second UI regarding the first object on the display of the electronic device, and
   wherein the first UI is different from the second UI.

2. The method of claim 1, further comprising:
   displaying a second object on the display of the electronic device;
   receiving, through the display of the electronic device, a third user touch input on the displayed second object; and
   based on that a pressure of the third user touch input is greater than or equal to a second reference pressure, executing a third function associated with the displayed second object,
   wherein the second reference pressure is different from the first reference pressure.

3. The method of claim 2, further comprising:
   in response to receiving the first user touch input, providing a first vibration feedback corresponding to the displayed first object.

4. The method of claim 3, further comprising:
   in response to receiving the second user touch input, providing a second vibration feedback corresponding to the displayed second object,
   wherein the first vibration feedback is different from the second vibration feedback.

5. The method of claim 4, wherein a strength of the first vibration feedback is different from a strength of the second vibration feedback.

6. The method of claim 1,
   wherein the first reference pressure is stored in attribute information of the displayed first object, and
   wherein the attribute information of the displayed first object further comprises at least one of a size of the displayed first object, a first priority level of the displayed first object, a number of files contained in the displayed first object, or an execution time of the displayed first object.

7. An electronic device, comprising:
   a display;
   at least one processor coupled to the display of the electronic device; and
   a memory, coupled to the at least one processor, the memory storing instructions that, when executed by the at least one processor, cause the at least one processor to control for:
      displaying a first object on the display of the electronic device,
      receiving, through the display of the electronic device, a first user touch input on the displayed first object,
      based on that a pressure of the first user touch input on the displayed first object is greater than or equal to a first reference pressure, executing a first function associated with the displayed first object while the first user touch input is maintained on the display of the electronic device,
      based on that the pressure of the first user touch input is not maintained on the display of the electronic device while executing the first function associated with the displayed first object, stopping the executing of the first function associated with the displayed first object, and
      based on that a second user touch input on the displayed first object is received through the display of the electronic device, executing a second function associated with the displayed first object,
   wherein the second user touch input is a drag interaction continuously input on the display from a point of the display corresponding to the first user touch input,
   wherein the first function is a function of displaying a first user interface (UI) regarding the first object on the display of the electronic device,
   wherein the second function is a function displaying a second UI regarding the first object on the display of the electronic device, and
   wherein the first UI is different from the second UI.

8. The electronic device of claim 7,
   wherein the instructions further cause the at least one processor to control for:
      displaying a second object on the display of the electronic device,
      receiving, through the display of the electronic device, a third user touch input on the displayed second object, and
      based on that a pressure of the third user touch input is greater than or equal to a second reference pressure, executing a third function associated with the displayed second object, and
   wherein the second reference pressure is different from the first reference pressure.

9. The electronic device of claim 8, wherein the instructions further cause the at least one processor to control for:
   in response to receiving the first user touch input, providing a first vibration feedback corresponding to the displayed first object.

10. The electronic device of claim 9,
    wherein the instructions further cause the at least one processor to control for:
       in response to receiving the second user touch input, providing a second vibration feedback corresponding to the displayed second object, and wherein the first vibration feedback is different from the second vibration feedback.

11. The electronic device of claim 10, wherein a strength of the first vibration feedback is different from a strength of the second vibration feedback.

12. The electronic device of claim 7, wherein the memory further stores attribute information of the displayed first object, and
wherein the attribute information of the displayed first object comprises the first reference pressure and at least one of a size of the displayed first object, a first priority level of the displayed first object, a number of files contained in the displayed first object, or an execution time of the displayed first object.

13. A non-transitory computer-readable medium configured to store one or more computer programs including instructions that, when executed by at least one processor, cause the at least one processor to control for:
displaying a first object on a display of an electronic device;
receiving, through the display of the electronic device, a first user touch input on the displayed first object;
based on that a pressure of the first user touch input on the displayed first object is greater than or equal to a first reference pressure, executing a first function associated with the displayed first object while the first user touch input is maintained on the display of the electronic device;
based on that the first user touch input not maintained on the display of the electronic device while executing the first function associated with the displayed first object, stopping the executing of the first function associated with the displayed first object; and
based on that a second user touch input on the displayed first object is received through the display of the electronic device, executing a second function associated with the displayed first object,
wherein the second user touch input is a drag interaction continuously input on the display from a point of the display corresponding to the first user touch input,
wherein the first function is a function of displaying a first user interface (UI) regarding the first object on the display of the electronic device,
wherein the second function is a function displaying a second UI regarding the first object on the display of the electronic device, and
wherein the first UI is different from the second UI.

14. The non-transitory computer-readable medium of claim 13,
wherein the one or more computer programs further include instructions for:
displaying a second object on the display of the electronic device;
receiving, through the display of the electronic device, a third user touch input on the displayed second object; and
based on that a pressure of the third user touch input is greater than or equal to a second reference pressure, executing a third function associated with the displayed second object, and
wherein the second reference pressure is different from the first reference pressure.

15. The non-transitory computer-readable medium of claim 14, wherein the one or more computer programs further include instructions for:
in response to receiving the first user touch input, providing a first vibration feedback corresponding to the displayed first object.

* * * * *